United States Patent
Ling et al.

(10) Patent No.: US 12,413,349 B2
(45) Date of Patent: Sep. 9, 2025

(54) PUCCH REPETITION NUMBER INDICATION

(71) Applicant: Lenovo (Beijing) Ltd., Beijing (CN)

(72) Inventors: Wei Ling, Beijing (CN); Chenxi Zhu, Beijing (CN); Bingchao Liu, Beijing (CN); Yi Zhang, Beijing (CN)

(73) Assignee: Lenovo (Beijing) Ltd., Beijing (CN)

( * ) Notice: Subject to any disclaimer, the term of this patent is extended or adjusted under 35 U.S.C. 154(b) by 507 days.

(21) Appl. No.: 17/919,451

(22) PCT Filed: Apr. 17, 2020

(86) PCT No.: PCT/CN2020/085306
§ 371 (c)(1),
(2) Date: Oct. 17, 2022

(87) PCT Pub. No.: WO2021/208065
PCT Pub. Date: Oct. 21, 2021

(65) Prior Publication Data
US 2023/0198684 A1    Jun. 22, 2023

(51) Int. Cl.
*H04W 72/21* (2023.01)
*H04L 1/1829* (2023.01)
*H04W 72/232* (2023.01)

(52) U.S. Cl.
CPC ........... *H04L 1/1864* (2013.01); *H04W 72/21* (2023.01); *H04W 72/232* (2023.01)

(58) Field of Classification Search
CPC .... H04L 1/1864; H04W 72/21; H04W 72/232
See application file for complete search history.

(56) References Cited

U.S. PATENT DOCUMENTS

| | | | |
|---|---|---|---|
| 2018/0367278 A1 | 12/2018 | Chatterjee et al. | |
| 2019/0223205 A1* | 7/2019 | Papasakellariou | H04W 72/23 |
| 2019/0230683 A1 | 7/2019 | Akkarakaran et al. | |
| 2021/0258966 A1* | 8/2021 | Yoshioka | H04L 1/1858 |
| 2022/0086032 A1* | 3/2022 | Park | H04W 72/0446 |
| 2023/0171778 A1* | 6/2023 | Kittichokechai | H04L 1/1671 |
| | | | 370/329 |

FOREIGN PATENT DOCUMENTS

| | | |
|---|---|---|
| CN | 110365451 A | 10/2019 |
| CN | 110719628 A | 1/2020 |
| EP | 3832929 A1 | 6/2021 |
| WO | 2016182320 A1 | 11/2016 |

(Continued)

OTHER PUBLICATIONS

"Foreign Office Action", CN Application No. 202080099306.0, Jan. 26, 2025, 6 pages.

(Continued)

*Primary Examiner* — Siren Wei
(74) *Attorney, Agent, or Firm* — FIG. 1 Patents

(57) ABSTRACT

Methods and apparatuses for indicating repetition number of PUCCH are disclosed. A base unit comprises a transmitter that transmits a configuration containing an indication of a repetition number of PUCCH, wherein the configuration is determined according to a type of UCI carried in the PUCCH; and a receiver that receives the PUCCH repeatedly with the repetition number.

20 Claims, 5 Drawing Sheets

(56) References Cited

FOREIGN PATENT DOCUMENTS

| WO | 2020026295 | A1 | 2/2020 |
| WO | 2020039484 | A1 | 2/2020 |
| WO | 2020066021 | A1 | 4/2020 |

OTHER PUBLICATIONS 20931034.1 , "Extended European Search Report", EP Application No. 20931034.1, Oct. 25, 2023, 8 pages.
CATT , "Correction for PUCCH repetition transmission", 3GPP TSG-RAN WG1 #100, R1-2000518, e-Meeting [retrieved Sep. 18, 2022]. Retrieved from the Internet <https://www.3gpp.org/ftp/tsg_ran/WG1_RL1/TSGR1_100_e/Docs>., Mar. 2020, 3 Pages.
ETRI , "Remaining issues about PUCCH", 3GPP TSG RAN WG1 Meeting 94, R1-1808812, Gothenburg, Sweden [retrieved Sep. 18, 2022]. Retrieved from the Internet <https://www.3gpp.org/ftp/tsg_ran/WG1_RL1/TSGR1_94/Docs>., Aug. 2018, 2 Pages.
PCT/CN2020/085306 , "International Preliminary Report on Patentability", PCT Application No. PCT/CN2020/085306, Oct. 27, 2022, 5 pages.
PCT/CN2020/085306 , "International Search Report and Written Opinion", PCT Application No. PCT/CN2020/085306, Jan. 25, 2021, 6 pages.
202080099306 , "Foreign Office Action", CN Application No. 202080099306, Jul. 24, 2024, 13 pages.

* cited by examiner

PUCCH REPETITION NUMBER INDICATION

FIELD

The subject matter disclosed herein generally relates to wireless communications, and more particularly relates to methods and apparatuses for indicating the repetition number of PUCCH.

BACKGROUND

The following abbreviations are herewith defined, at least some of which are referred to within the following description: Third Generation Partnership Project (3GPP), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Radio Resource Control (RRC), User Entity/Equipment (Mobile Terminal) (UE), Physical Downlink Shared Channel (PDSCH), Physical Uplink Shared Channel (PUSCH), Physical Uplink Control Channel (PUCCH), Downlink control information (DCI), transmission reception point (TRP), multiple TRP (multi-TRP or M-TRP), frequency range 2 (FR2), channel state information (CSI), CSI-RS Resource Indicator (CRI), Transmission Configuration Indication (TCI), Sounding Reference Signal (SRS), Control Resource Set (CORESET), Synchronization Signal (SS), reference signal (RS), Uplink control information (UCI), media access control (MAC), control element (CE), Scheduling Request (SR), Hybrid Automatic Repeat Request (HARQ), Hybrid Automatic Repeat Request acknowledgement (HARQ-ACK), Semi-Persistent Scheduling (SPS), Technical Specification (TS), Semi-persistent (SP), bandwidth Part (BWP), Ultra-reliable and Low Latency Communications (URLLC).

UCI repetitions with multiple beams in multiple slots can utilize the spatial diversity of multiple beams of PUCCH transmission to increase the reliability and robustness of UCI transmission. However, in NR Release 15, the repetition number of PUCCH is configured per PUCCH format. In addition, only long PUCCH resource whose format is 1, 3 or 4 can be configured to be transmitted repeatedly (i.e. transmitted with a repetition number of times). For example, for PUCCH formats 1, 3, or 4, a UE can be configured with a number of slots, $N_{PUCCH}^{repeat}$, for repetitions of a PUCCH transmission by respective nrofSlots. The above-mentioned indication of the repetition number of PUCCH is not flexible.

This disclosure targets improving the indication of the repetition number of PUCCH.

BRIEF SUMMARY

Methods and apparatuses for are disclosed.

In one embodiment, a base unit comprises a transmitter that transmits a configuration containing an indication of a repetition number of PUCCH, wherein the configuration is determined according to a type of UCI carried in the PUCCH; and a receiver that receives the PUCCH repeatedly with the repetition number.

In one embodiment, the configuration is a RRC signaling for all types of UCI carried in the PUCCH, and the indication is per PUCCH resource. In another embodiment, the configuration is a MAC CE for all types of UCI carried in the PUCCH, and the indication is per PUCCH resource or per PUCCH resource group.

In yet another embodiment, when the type of UCI carried in the PUCCH is one of periodic CSI, SR and HARQ-ACK corresponding to DL SPS, the configuration is a RRC signaling. When the type of UCI carried in the PUCCH is semi-persistent CSI, the configuration is a MAC CE activating the semi-persistent CSI.

In some embodiment, when the type of UCI carried in the PUCCH is HARQ-ACK corresponding to a DL transmission scheduled by a DCI, the configuration is the DCI scheduling the DL transmission. The indication may be contained in a new field of the DCI. Alternatively, the indication may be contained in a time domain resource assignment field of the DCI. For example, a value of the time domain allocation assignment field indicates a row in a table which includes a column for indicating the repetition number. The table may be configured by RRC as pdsch time domain allocation list, or may be a predefined table if pdsch time domain allocation list is not configured. The column for indicating the repetition number may be a newly added column in the table, or an existing column in the table that is also used for indicating a repetition number of the PDSCH carrying the scheduled DL transmission. The indication may also be contained in a PDSCH-to-HARQ_feedback timing indicator field of the DCI. For example, a value of the PDSCH-to-HARQ-feedback timing indicator field indicates a row in a table which includes a column for indicating the repetition number. The table may be configured by RRC as dl data to ul ACK list, or may be a predefined table if dl data to ul ACK list is not configured. The column for indicating the repetition number may be a newly added column in the table.

In some embodiment, when the type of UCI carried in the PUCCH is not the HARQ-ACK corresponding to the DL transmission scheduled by the DCI, the configuration is a RRC signaling and the indication is per PUCCH format.

In one embodiment, a method comprises transmitting a configuration containing an indication of a repetition number of PUCCH, wherein the configuration is determined according to a type of UCI carried in the PUCCH; and receiving the PUCCH repeatedly with the repetition number.

In another embodiment, a remote unit comprises a receiver that receives a configuration containing an indication of a repetition number of PUCCH, wherein the configuration is determined according to a type of UCI carried in the PUCCH; and a transmitter that transmits the PUCCH repeatedly with the repetition number.

In yet another embodiment, a method comprises receiving a configuration containing an indication of a repetition number of PUCCH, wherein the configuration is determined according to a type of UCI carried in the PUCCH; and transmitting the PUCCH repeatedly with the repetition number.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered to be limiting of scope, the embodiments will be described and explained with additional specificity and detail through the use of the accompanying drawings, in which.

DETAILED DESCRIPTION

Figure 1:
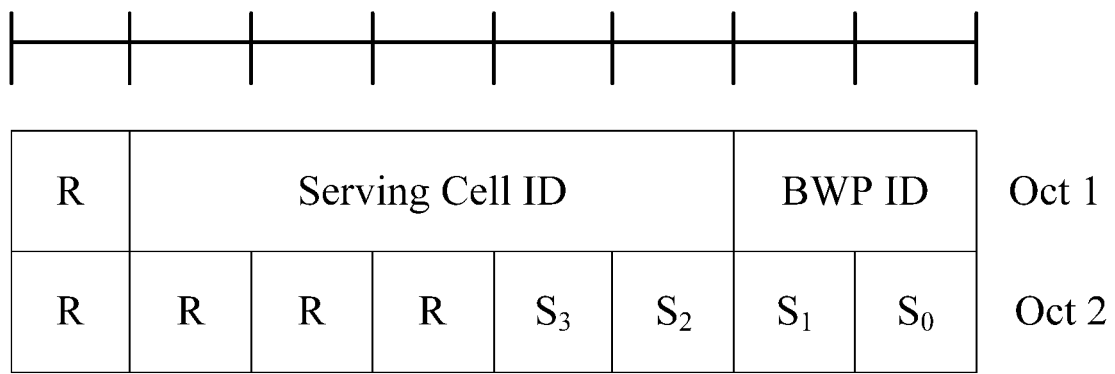
FIG. 1 illustrates a MAC CE for activating semi-persistent CSI in TS 38.321.

As will be appreciated by one skilled in the art that certain aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may contain a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may include any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, described features, structures, or characteristics of various embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of different embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each Figure may refer to elements of proceeding figures. Like numbers refer to like elements in all figures, including alternate embodiments of like elements.

The UCI carried in PUCCH can be classified as periodic UCI (e.g. any one of periodic CSI, SR or HARQ-ACK corresponding to DL SPS), semi-persistent UCI (e.g. semi-persistent CSI), and non-periodic UCI (e.g. HARQ-ACK corresponding to DL scheduling). The repetition number of PUCCH can be indicated according to the types of the UCI carried in the PUCCH. For example, the indication of the repetition number of PUCCH can be the same for all types of the UCI carried in the PUCCH. Alternatively, the repetition number of PUCCH can be indicated by different ways for different types of UCI carried in the PUCCH. Explanations of the disclosure are described in detail.

According to a first embodiment, for all types of the UCI carried in the PUCCH, the repetition number of PUCCH (hereinafter, may be abbreviated as "repetition number") is configured for each PUCCH resource by RRC. Different from the prior art in which the repetition number is configured per PUCCH format, according to the first embodiment, the repetition number is configured per PUCCH resource. Accordingly, the gNB may configure different repetition numbers for different PUCCH resources of the same PUCCH format to provide the largest flexibility. On the other hand, the configuration of the repetition number for each PUCCH resource by RRC may cause a lot of overhead, and may also cause larger latency for updating the repetition number.

As an example of the first embodiment, the RRC configuration of PUCCH resource in TS 38.331 may add a line to indicate the repetition number of PUCCH. In the following example, the added line is named as nrofSlots with possible values of any one of {n1, n2, n4, n8}.

```
PUCCH-Resource ::=              SEQUENCE
    pucch-ResourceId            PUCCH-ResourceId,
    startingPRB                 PRB-Id,
    intraSlotFrequencyHopping   ENUMERATED
{ enabled }
    secondHopPRB                PRB-Id
    format                      CHOICE {
        format0                     PUCCH-format0,
        format1                     PUCCH-format1,
        format2                     PUCCH-format2,
        format3                     PUCCH-format3,
        format4                     PUCCH-format4
    }
    nrofSlots                   ENUMERATED {n1,n2,n4,n8}
}
```

According to a second embodiment, for all types of the UCI carried in the PUCCH, the repetition number can be indicated or updated by a MAC CE. The repetition number of the PUCCH can be indicated in the MAC CE for each PUCCH resource or for each PUCCH resource group which includes a plurality of PUCCH resources.

An example of the MAC CE for indicating the repetition number for each PUCCH resource can be constructed by indicating a repetition number for each of PUCCH resources indicated in the MAC CE.

Another example of the MAC CE for indicating the repetition number for each PUCCH resource group can be constructed by indicating a repetition number for each of PUCCH resource groups indicated in the MAC CE. All of PUCCH resources contained in one PUCCH resource group would be configured with the same repetition number.

If the repetition number of the PUCCH has been indicated by RRC either per PUCCH format or per PUCCH resource, the indication of the repetition number of the PUCCH by MAC CE will update the existing indication.

Compared with indicating the repetition number by RRC according to the first embodiment, the indication of the repetition number by MAC CE can be faster and cause less overhead.

In the above-described first and second embodiment, the indication of the repetition number of PUCCH by RRC or MAC CE is for all types of UCI carried in the PUCCH. In the following third, fourth and fifth embodiments, the repetition number of PUCCH can be indicated by different ways for different types of UCI carried in the PUCCH.

A third embodiment relates to indicating the repetition number of PUCCH carrying periodic UCI (e.g. any one of periodic CSI, SR or HARQ-ACK corresponding to DL SPS). A fourth embodiment relates to indicating the repetition number of PUCCH carrying semi-persistent UCI (e.g. semi-persistent CSI). A fifth embodiment relates to indicating the repetition number of PUCCH carrying non-periodic UCI (e.g. HARQ-ACK corresponding to DL scheduling).

The periodic UCI, e.g. any one of periodic CSI, SR or HARQ-ACK corresponding to DL SPS, is configured to be transmitted in a PUCCH resource by RRC. According to the third embodiment, the repetition number of PUCCH carrying the periodic UCI is indicated in the RRC configuring the PUCCH resource.

For example, for PUCCH resource carrying periodic CSI, the RRC configuration in TS38.331 may be updated to add a line to indicate the repetition number of PUCCH carrying periodic CSI. In the following example, the added line is named as nrofSlots with possible values of any one of {n1, n2, n4, n8}.

```
CSI-ReportConfig ::=                                    SEQUENCE {
    reportConfigId                                          CSI-ReportConfigId,
    carrier                                                 ServCellIndex
OPTIONAL,  -- Need S
    resourcesForChannelMeasurement                          CSI-
ResourceConfigId,
    csi-IM-ResourcesForInterference                         CSI-ResourceConfigId
OPTIONAL,  -- Need R
    nzp-CSI-RS-ResourcesForInterference                     CSI-ResourceConfigId
OPTIONAL,  -- Need R
    reportConfigType                                        CHOICE {
        periodic                                                SEQUENCE {
            reportSlotConfig                                        CSI-
ReportPeriodicxtyAndOffset,
            pucch-CSI-ResourceList                                  SEQUENCE
(SIZE (1..maxNrofBWPs)) OF PUCCH-CSI-Resource
        },
        semiPersistentOnPUCCH                                   SEQUENCE {
            reportSlotConfig                                        CSI-
ReportPeriodicityAndOffset,
            pucch-CSI-ResourceList                                  SEQUENCE
(SIZE (1..maxNrofBWPs)) OF PUCCH-CSI-Resource
        },
        semiPersistentOnPUSCH                                   SEQUENCE {
            reportSlotConfig                                        ENUMERATED
{sl5, sl10, sl20, sl40, sl80,sl160, sl320},
            reportSlotOffsetList                                    SEQUENCE (SIZE
(1.. maxNrofUL-Allocations)) OF INTEGER(0..32),
            p0alpha                                                 P0-PUSCH-
AlphaSetId
        },
        aperiodic                                               SEQUENCE {
            reportSlotOffsetList                                    SEQUENCE (SIZE
(1..maxNrofUL-Allocations) ) OF INTEGER(0..32)
        }
    },
    reportQuantity                                          CHOICE {
        none                                                    NULL,
        cri-RI-PMI-CQI                                          NULL,
        cri-RI-i1                                               NULL,
        cri-RI-i1-CQI                                           SEQUENCE {
            pdsch-BundleSizeForCSI                                  ENUMERATED
{n2, n4}                                                        OPTIONAL  --
Need S
        },
        cri-RI-CQI                                              NULL,
        cri-RSRP                                                NULL,
        ssb-Index-RSRP                                          NULL,
        cri-RI-LI-PMI-CQI                                       NULL
    },
    reportFreqConfiguration                                 SEQUENCE {
        cqi-FormatIndicator                                     ENUMERATED
{ widebandCQI, subbandCQI }                                      OPTIONAL,
-- Need R
        pmi-FormatIndicator                                     ENUMERATED
{ widebandPMI, subbandPMI }                                      OPTIONAL,
-- Need R
        csi-ReportingBand                                       CHOICE {
            subbands3                                               BIT
```

```
          STRING(SIZE(3)),
       subbands4                           BIT
STRING(SIZE(4)),
       subbands5                           BIT
STRING(SIZE(5)),
       subbands6                           BIT
STRING(SIZE(6)),
       subbands7                           BIT
STRING(SIZE(7)),
       subbands8                           BIT
STRING(SIZE(8)),
       subbands9                           BIT
STRING(SIZE(9)),
       subbands10                          BIT
STRING(SIZE(10)),
       subbands11                          BIT
STRING(SIZE(11)),
       subbands12                          BIT
STRING(SIZE(12)),
       subbands13                          BIT
STRING(SIZE(13)),
       subbands14                          BIT
STRING(SIZE(14)),
       subbands15                          BIT
STRING(SIZE(15)),
       subbands16                          BIT
STRING(SIZE(16)),
       subbands17                          BIT
STRING(SIZE(17)),
       subbands18                          BIT
STRING(SIZE(18)),
       ...,
       subbands19-v1530                    BIT
STRING(SIZE(19))
    }  OPTIONAL    -- Need S
   }
OPTIONAL,  -- Need R
    timeRestrictionForChannelMeasurements     ENUMERATED
{configured, notConfigured},
    timeRestrictionForInterferenceMeasurements ENUMERATED
{configured, notConfigured},
    codebookConfig
CodebookConfig
OPTIONAL,   -- Need R
    dummy                                  ENUMERATED
{n1, n2}                                   OPTIONAL,  --
Need R
    groupBasedBeamReporting                CHOICE {
       enabled                                NULL,
       disabled                               SEQUENCE {
          nrofReportedRS                       ENUMERATED
{n1, n2, n3, n4}                           OPTIONAL,  --
Need S
       }
    },
    cqi-Table                 ENUMERATED {table1, table2,
table3, spare1}                            OPTIONAL,
-- Need R
    subbandSize              ENUMERATED {value1, value2},
    non-PMI-PortIndication   SEQUENCE (SIZE (1..maxNrofNZP-
CSI-RS-ResourcesPerConfig)) OF PortIndexFor8Ranks OPTIONAL,  --
Need R
    ...,
    [[
    semiPersistentOnPUSCH-v1530            SEQUENCE {
       reportSlotConfig-v1530                 ENUMERATED {sl4,
sl8, sl16}
    }
OPTIONAL   -- Need R
    ]]
}
CSI-ReportPeriodicityAndOffset ::=         CHOICE {
    slots4                                 INTEGER(0..3),
    slots5                                 INTEGER(0..4),
    slots8                                 INTEGER(0..7),
    slots10                                INTEGER(0..9),
    slots16                                INTEGER(0..15),
    slots20                                INTEGER(0..19),
    slots40                                INTEGER(0..39),
```

-continued

```
    slots80                          INTEGER(0..79),
    slots160                         INTEGER(0..159),
    slots320                         INTEGER(0..319)
}
PUCCH-CSI-Resource ::=               SEQUENCE {
    uplinkBandwidthPartId            BWP-Id,
    pucch-Resource                   PUCCH-ResourceId
    nrofSlots                        ENUMERATED {n1,n2,n4,n8}
OPTIONAL,
}
```

For PUCCH carrying SR, the RRC configuration in TS 38.331 may be updated to add a line to indicate the repetition number of PUCCH carrying SR. In the following example, the added line is named as nrofSlots with possible values of any one of {n1,n2,n4,n8}.

```
SchedulingRequestResourceConfig ::=  SEQUENCE {
    schedulingRequestResourceId
    SchedulingRequestResourceId,
    schedulingRequestID              SchedulingRequestId,
    periodicityAndOffset             CHOICE {
        sym2                         NULL,
        sym6or7                      NULL,
        sl1                          NULL,
-- Recurs in every slot
        sl2                          INTEGER (0..1),
        sl4                          INTEGER (0..3),
        sl5                          INTEGER (0..4),
        sl8                          INTEGER (0..7),
        sl10                         INTEGER (0..9),
        sl16                         INTEGER (0..15),
        sl20                         INTEGER (0..19),
        sl40                         INTEGER (0..39),
        sl80                         INTEGER (0..79),
        sl160                        INTEGER
(0..159),
        sl320                        INTEGER
(0..319),
        sl640                        INTEGER (0..639)
    }
    OPTIONAL,  -- Need M
    resource                         PUCCH-Resource OPTIONAL
-- Need M
    nrofSlots                        ENUMERATED {n1,n2,n4,n8}
OPTIONAL,
}
```

For PUCCH carrying HARQ-ACK corresponding to DL SPS, the RRC configuration in TS 38.331 may be updated to add a line to indicate the repetition number of PUCCH carrying HARQ-ACK corresponding to DL SPS. In the following example, the added line is named as nrofSlots with possible values of any one of {n1,n2,n4,n8}.

```
SPS-Config ::=                       SEQUENCE {
    periodicity                      ENUMERATED {ms10,
ms20, ms32, ms40, ms64, ms80, ms128, ms160, ms320, ms640,
                                     spare6,
    spare5, spare4, spare3, spare2, spare1},
    nrofHARQ-Processes               INTEGER (1..8),
    n1PUCCH-AN                       PUCCH-ResourceId
OPTIONAL,  -- Need M
    nrofSlots                        ENUMERATED {n1,n2,n4,n8}
OPTIONAL,
    mcs-Table                        ENUMERATED
{qam64LowSE}
OPTIONAL,  -- Need S
    ...
}
```

The semi-persistent UCI, e.g. semi-persistent CSI, which is configured to be transmitted in a PUCCH resource, is activated by a MAC CE in NR release15. According to the fourth embodiment, the repetition number of PUCCH carrying the semi-persistent UCI, e.g. semi-persistent CSI, is indicated in a redesigned MAC CE activating the semi-persistent CSI.

The MAC CE for activating semi-persistent CSI in TS 38.321 is shown in FIG. 1. As shown in FIG. 1, the SP CSI reporting on PUCCH Activation/Deactivation MAC CE has a fixed size of 16 bits with following fields:

Serving Cell ID: This field indicates the identity of the Serving Cell for which the MAC CE applies. The length of the field is 5 bits.

BWP ID: This field indicates a UL BWP for which the MAC CE applies as the codepoint of the DCI bandwidth part indicator field as specified in TS 38.212 [9]. The length of the BWP ID field is 2 bits.

$S_i$ (i=0, 1, 2 and 3): This field indicates the activation/deactivation status of the Semi-Persistent CSI report configuration within csi-ReportConfigToAddModList, as specified in TS 38.331 [5]. $S_0$ refers to the report configuration which includes PUCCH resources for SP CSI reporting in the indicated BWP and has the lowest CSI-ReportConfigId within the list with type set to semiPersistentOnPUCCH, $S_1$ refers to the report configuration which includes PUCCH resources for SP CSI reporting in the indicated BWP and has the second lowest CSI-ReportConfigId and so on. If the number of report configurations within the list with type set to semiPersistentOnPUCCH in the indicated BWP is less than i+1, MAC entity shall ignore the $S_i$ field. The $S_i$ field is set to 1 to indicate that the corresponding Semi-Persistent CSI report configuration shall be activated. The $S_i$ field is set to 0 to indicate that the corresponding Semi-Persistent CSI report configuration i shall be deactivated.

R: Reserved bit, set to 0.

According to the fourth embodiment, the repetition number of PUCCH carrying semi-persistent CSI can be indicated by using the reserved bits of the SP CSI reporting on PUCCH Activation/Deactivation MAC CE, e.g., the 4 reserved bits in Oct 2.

Figure 2:
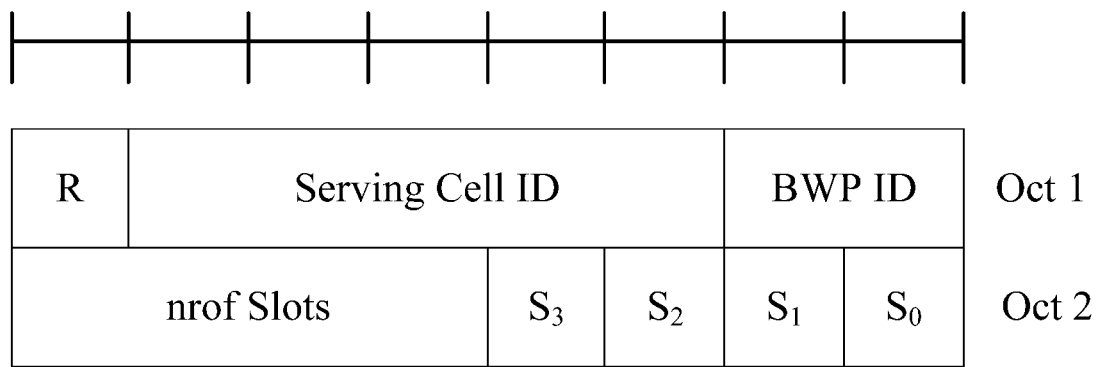
FIG. 2 illustrates a MAC CE according to a fourth embodiment.

FIG. 2 illustrates an example of the SP CSI reporting on PUCCH Activation/Deactivation MAC CE according to the fourth embodiment. As shown in FIG. 2, the 4 reserved bits in Oct 2 of FIG. 1 are used to indicate the repetition number of the PUCCH carrying the semi-persistent CSI activated by said MAC CE. In particular, a field 'nrofSlots' of at most 4 bits are contained in the SP CSI reporting on PUCCH Activation/Deactivation MAC CE according to the fourth embodiment to indicate the repetition number of each PUCCH carrying each of the Semi-Persistent CSIs activated by $S_i$ (i=0, 1, 2 and 3) being set to 1. That is, all of PUCCHs each of which carries one of the activated Semi-Persistent CSIs by $S_i$ (i=0, 1, 2 and 3) being set to 1 of the SP CSI reporting on PUCCH Activation/Deactivation MAC CE according to the fourth embodiment are indicated with the same repetition number by the nrofSlots field.

The indication of the repetition number may not occupy all 4 reserved bits in Oct 2. For example, if the repetition number has four possible values, 2 reserved bits in Oct 2 are enough for indicating four different repetition numbers.

Incidentally, the repetition number of PUCCH carrying semi-persistent CSI can be alternatively indicated in CSI-ReportConfig by RRC in the same way as the third embodiment.

The HARQ-ACK corresponding to a scheduled DL transmission is transmitted in a PUCCH resource. The DCI scheduling a DL transmission also schedules the PUCCH resource used for transmitting the HARQ-ACK corresponding to the scheduled DL transmission. Therefore, according to the fifth embodiment, the repetition number of the PUCCH carrying the HARQ-ACK corresponding to the scheduled DL transmission is indicated in the DCI scheduling the DL transmission.

There are three options to indicate the repetition number of the PUCCH carrying the HARQ-ACK corresponding to the scheduled DL transmission in the DCI scheduling the DL transmission (may be abbreviated as "scheduling DCI" hereinafter).

According to a first sub-embodiment of the fifth embodiment, a new DCI field is added to the scheduling DCI to indicate the repetition number of PUCCH carrying HARQ-ACK corresponding to the scheduled DL transmission. According to the first sub-embodiment, the highest flexibility is obtained. However, the payload of the scheduling DCI increases compared with the legacy scheduling DCI, which will increase the complexity of DCI decoding.

According to a second sub-embodiment of the fifth embodiment, the repetition number of PUCCH carrying the HARQ-ACK corresponding to the scheduled DL transmission is indicated in the time domain resource assignment field of the scheduling DCI. The value m of the time domain resource assignment field indicates a row m+1 to an allocated table in NR Release 15. The allocated table is configured by pdsch-TimeDomainAllocationList in pdsch-Config by RRC. If pdsch-TimeDomainAllocationList is not configured, the allocated table is a predefined table. According to the second sub-embodiment, a new column is added to the allocated table to indicate the repetition number of the PUCCH carrying HARQ-ACK corresponding to the scheduled DL transmission. In other words, the value m of the time domain resource assignment field of the DCI according to the second sub-embodiment indicates a row m+1 of the allocated table which indicates the time allocation of the PDSCH carrying the scheduled DL transmission as well as the repetition number of the PUCCH carrying the HARQ-ACK corresponding to the scheduled DL transmission.

For example, the configuration of pdsch-TimeDomainAllocationList in TS38.331 may be updated to add a column to indicate the repetition number of PUCCH carrying the HARQ-ACK corresponding to the scheduled DL transmission. In the following example, the added column is named as nrofSlots with possible values of any one of {n1,n2,n4,n8}.

```
PDSCH-TimeDomainResourceAllocationList ::=        SEQUENCE
(SIZE(1..maxNrofDL-Allocations)) OF PDSCH-
TimeDomainResourceAllocation
PDSCH-TimeDomainResourceAllocation ::=            SEQUENCE {
    k0                                                INTEGER(0..32)
OPTIONAL,    -- Need S
        mappingType                                   ENUMERATED {typeA,
typeB},
        startSymbolAndLength                          INTEGER (0..127)
        nrofSlots                                     ENUMERATED {n1,n2,n4,n8}
OPTIONAL,
}
```

According to the above-described second sub-embodiment, a column named as nrofSlots is added to the configuration of the allocated table configured by pdsch-TimeDomainAllocationList (or a predefined table if pdsch-TimeDomainAllocationList is not configured) in TS38.331 of NR Release 15. In URLLC (Ultra-reliable and Low Latency Communications) Scheme 4 in NR Release 16, the repetition number of PDSCH carrying the scheduled DL transmission is supported by adding a new column in the allocated table in the time domain resource assignment field. In the following example, the added column is named as repNumR16 with possible values of any one of {n1,n2,n4,n8}.

It can be seen that the repetition number of PDSCH carrying the DL transmission scheduled by the DCI of URLLC scheme 4 and the repetition number of PUCCH carrying the HARQ-ACK corresponding to the scheduled DL transmission are separately indicated by repNumR16 and nrofSlots, respectively.

According to a third sub-embodiment of the fifth embodiment, the repetition number of PUCCH resource is indicated in the PDSCH-to-HARQ_feedback timing indicator field of the DCI. The value m of the PDSCH-to-HARQ_feedback timing indicator field indicates a row m+1 of an allocated table in NR Release 15. The allocated table is configured by dl-DataToUL-ACK in pdsch-Config by RRC. If dl-Data-

```
PDSCH-TimeDomainResourceAllocationList ::=            SEQUENCE
(SIZE(1..maxNrofDL-Allocations)) OF PDSCH-
TimeDomainResourceAllocation
PDSCH-TimeDomainResourceAllocation ::=                SEQUENCE {
    k0                                                    INTEGER(0..32)
OPTIONAL,   -- Need S
    mappingType                                           ENUMERATED {typeA,
typeB},
    startSymbolAndLength                                  INTEGER (0..127)
    repNumR16                                             ENUMERATED {n1,n2,n4,n8}
OPTIONAL,
}
```

According to a variety of the second sub-embodiment, the repetition number of PDSCH indicated in the column named as repNumR16 is reused as the repetition number of PUCCH carrying the HARQ-ACK corresponding to the scheduled DL transmission. That is to say, the PDSCH carrying the DL transmission scheduled by the DCI and the PUCCH carrying the HARQ-ACK corresponding to the scheduled DL transmission are repeatedly transmitted with the same repetition number indicated by the added column 'repNumR16' in the allocated table configured by pdsch-TimeDomainAllocationList (or in a predefined table if the pdsch-TimeDomainAllocationList is not configured) indicated by the time domain resource assignment field of the DCI.

According to another variety of the second sub-embodiment, in addition to the repNumR16 added for indicating the repetition number of PDSCH carrying the DL transmission scheduled by the DCI, a new column named as nrofSlots (with possible values of any one of {n1,n2,n4,n8}) is additionally added to the allocated table configured by pdsch-TimeDomainAllocationList in pdsch-Config (or to a predefined table if the pdsch-TimeDomainAllocationList is not configured). In the following example, the added columns are named as repNumR16 and nrofSlots in the pdsch-TimeDomainAllocationList in pdsch-Config, each of which has a possible value of any one of {n1,n2,n4,n8}.

ToUL-ACK is not configured, the allocated table is a predefined table. It should be noted that there is only one column in the allocated table in NR Release 15. According to the present invention, dl-DataToUL-ACK is named as dl-DataToUL-ACKList. According to the third sub-embodiment, a new column is added to in the dl-DataToUL-ACKList to indicate the repetition number of the PUCCH resource carrying HARQ-ACK corresponding to the scheduled DL transmission. Therefore, the value m of the PDSCH-to-HARQ_feedback timing indicator field indicates a row m+1 in the dl-DataToUL-ACKList which indicates the time offset between the PDSCH carrying the scheduled DL transmission and the PUCCH carrying the HARQ-ACK corresponding to the scheduled DL transmission as well as the repetition time of the PUCCH.

For example, the configuration in TS 38.331 may be updated to add a column to indicate the repetition number of PUCCH carrying the HARQ-ACK corresponding to the scheduled DL transmission. In the following example, the added column is named as nrofSlots (with possible values of any one of {n1,n2,n4,n8}) in dl-DataToUL-ACKList. Incidentally, the column named as 'k' indicates the time offset between the PDSCH carrying the scheduled DL transmission and the PUCCH carrying the HARQ-ACK corresponding to the scheduled DL transmission.

```
PDSCH-TimeDomainResourceAllocationList ::=            SEQUENCE
(SIZE(1..maxNrofDL-Allocations)) OF PDSCH-
TimeDomainResourceAllocation
PDSCH-TimeDomainResourceAllocation ::=                SEQUENCE {
    k0                                                    INTEGER (0..32)
OPTIONAL,   -- Need S
    mappingType                                           ENUMERATED {typeA,
typeB},
    startSymbolAndLength                                  INTEGER (0..127)
    repNumR16                                             ENUMERATED {n1,n2,n4,n8}
OPTIONAL,
    nrofSlots                                             ENUMERATED {n1,n2,n4,n8}
OPTIONAL,
}
```

```
PUCCH-Config ::=                                        SEQUENCE {
    resourceSetToAddModList                             SEQUENCE (SIZE
(1..maxNrofPUCCH-ResourceSets)) OF PUCCH-ResourceSet        OPTIONAL,
-- Need N
    resourceSetToReleaseList                            SEQUENCE (SIZE
(1..maxNrofPUCCH-ResourceSets) ) OF PUCCH-ResourceSetId     OPTIONAL,
-- Need N
    resourceToAddModList                                SEQUENCE (SIZE
(1..maxNrofPUCCH-Resources) ) OF PUCCH-Resource             OPTIONAL,
-- Need N
    resourceToReleaseList                               SEQUENCE (SIZE
(1..maxNrofPUCCH-Resources)) OF PUCCH-ResourceId            OPTIONAL,
-- Need N
    format1                                             SetupRelease
{ PUCCH-FormatConfig }
OPTIONAL,   -- Need M
    format2                                             SetupRelease
{ PUCCH-FormatConfig }
OPTIONAL,   -- Need M
    format3                                             SetupRelease
{ PUCCH-FormatConfig }
OPTIONAL,   -- Need M
    format4                                             SetupRelease
{ PUCCH-FormatConfig }
OPTIONAL,   -- Need M
    schedulingRequestResourceToAddModList               SEQUENCE (SIZE
(1..maxNrofSR-Resources)) OF SchedulingRequestResourceConfig
OPTIONAL,   -- Need N
    schedulingRequestResourceToReleaseList              SEQUENCE (SIZE
(1..maxNrofSR-Resources)) OF SchedulingRequestResourceId
OPTIONAL,   -- Need N
    multi-CSI-PUCCH-ResourceList                        SEQUENCE (SIZE
(1..2)) OF PUCCH-ResourceId                                 OPTIONAL,
-- Need M
    dl-DataToUL-ACKList                                 SetupRelease {dl-
DataToUL-ACKList}                                           OPTIONAL,   -- Need
M
    spatialRelationInfoToAddModList                     SEQUENCE (SIZE
(1..maxNrofSpatialRelationInfos)) OF PUCCH-SpatialRelationInfo
OPTIONAL,   -- Need N
    spatialRelationInfoToReleaseList                    SEQUENCE (SIZE
(1..maxNrofSpatialRelationInfos)) OF PUCCH-SpatialRelationInfoId
OPTIONAL,   -- Need N
    pucch-PowerControl                                  PUCCH-PowerControl
OPTIONAL,   -- Need M
    ...
}
dl-DataToUL-ACKList ::=                                 SEQUENCE (SIZE(1..maxNrofDL-DataToUL-
ACK)) OF dl-DataToUL-ACK
dl-DataToUL-ACK ::=                                     SEQUENCE {
    k                                                   INTEGER (0..15)
    nrofSlots                                           ENUMERATED {n1,n2,n4,n8}
OPTIONAL,
}
```

According to the sixth embodiment, similar to the third to the fifth embodiments, the repetition number of PUCCH can be indicated by different ways depending on different types of UCI carried in the PUCCH.

Considering that the reliability of PUCCH carrying HARQ-ACK corresponding to a scheduled DL transmission is more important for the throughput of network than other types of UCI, it is favorite to provide more flexibility only to indicate the repetition number of PUCCH carrying the HARQ-ACK corresponding to the scheduled DL transmission. According to the sixth embodiment, if the PUCCH carries UCI that is not HARQ-ACK corresponding to a scheduled DL transmission, the repetition number of PUCCH is indicated per PUCCH format as in TS 38.331. On the other hand, if the PUCCH carries the HARQ-ACK corresponding to the scheduled DL transmission, the repetition number of the PUCCH can be indicated to updated by the scheduling DCI as described in the fifth embodiment.

The advantage of the sixth embodiment lies in that the repetition number of PUCCH carrying the HARQ-ACK corresponding to the scheduled DL transmission, which requires high level of reliability, can be indicated more flexibly by using the scheduling DCI as described in the fifth embodiment, while the repetition number of PUCCH carrying other types of UCI than the HARQ-ACK corresponding to the scheduled DL transmission can be indicated in the existing way (i.e. indicated per PUCCH format as in TS 38.331) to reduce the impact to the existing specification.

As a whole, according to the present application, the configuration containing the indication of the repetition number of PUCCH can be determined according to the type of UCI carried in the PUCCH. The configuration may be RRC signaling or MAC CE or scheduling DCI.

Figure 3:
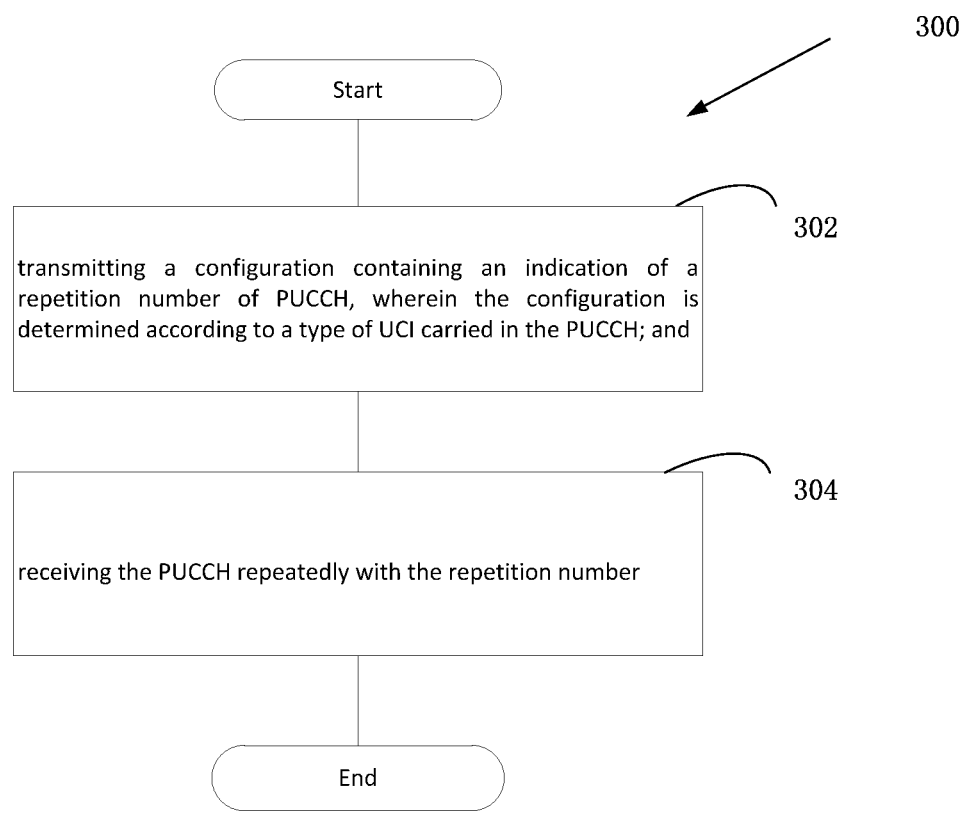
FIG. 3 is a schematic flow chart diagram illustrating an embodiment of a method.

FIG. 3 is a schematic flow chart diagram illustrating an embodiment of a method 300 according to the present application. In some embodiments, the method 300 is performed by an apparatus, such as a base unit. In certain embodiments, the method 300 may be performed by a processor executing program code, for example, a microcontroller, a microprocessor, a CPU, a GPU, an auxiliary processing unit, a FPGA, or the like.

The method 300 may include 302 transmitting a configuration containing an indication of a repetition number of PUCCH, wherein the configuration is determined according to a type of UCI carried in the PUCCH; and 304 receiving the PUCCH repeatedly with the repetition number.

Figure 4:
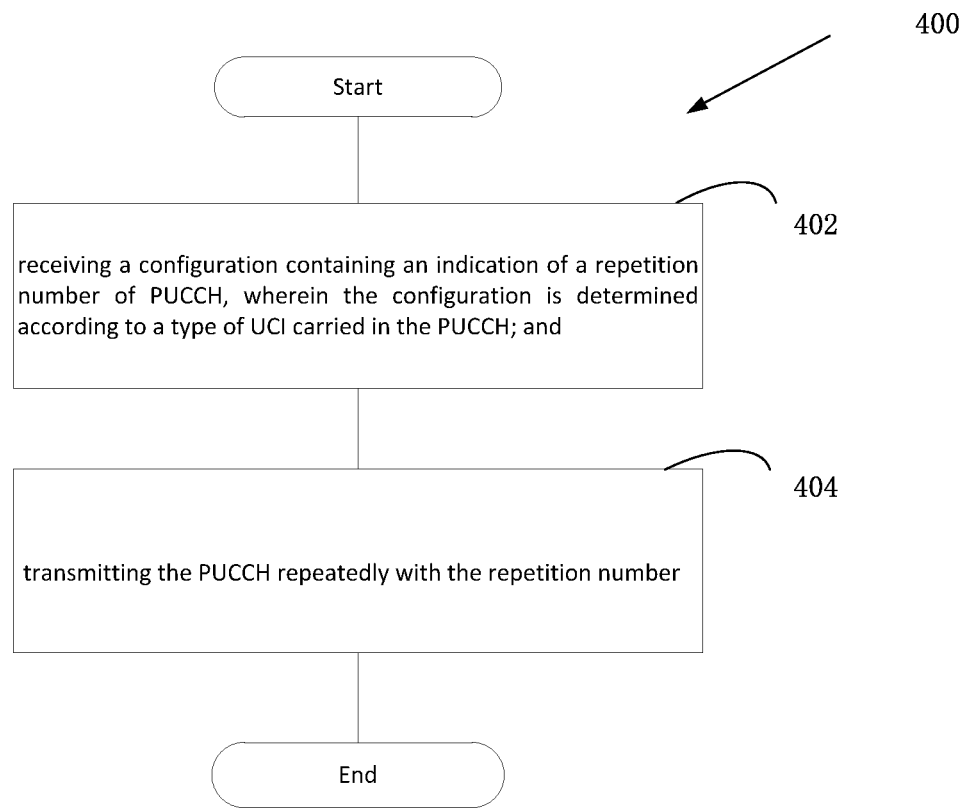
FIG. 4 is a schematic flow chart diagram illustrating a further embodiment of a method.

FIG. 4 is a schematic flow chart diagram illustrating a further embodiment of a method 400 according to the present application. In some embodiments, the method 400 is performed by an apparatus, such as a remote unit. In certain embodiments, the method 400 may be performed by a processor executing program code, for example, a microcontroller, a microprocessor, a CPU, a GPU, an auxiliary processing unit, a FPGA, or the like.

The method 400 may include 402 receiving a configuration containing an indication of a repetition number of PUCCH, wherein the configuration is determined according to a type of UCI carried in the PUCCH; and 404 transmitting the PUCCH repeatedly with the repetition number.

Figure 5:
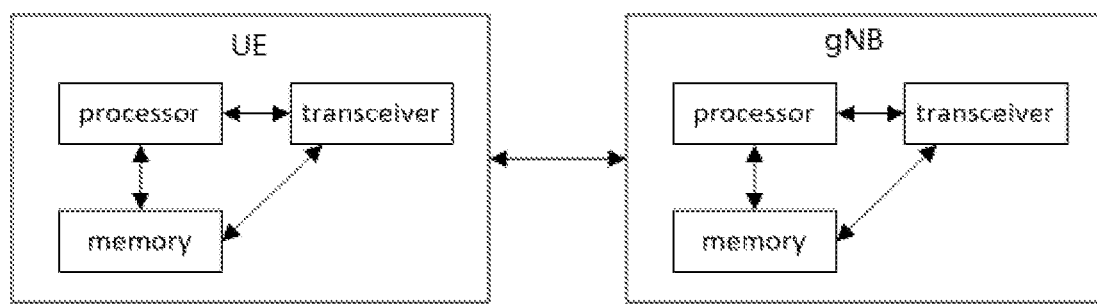
FIG. 5 is a schematic block diagram illustrating apparatuses according to one embodiment.

FIG. 5 is a schematic block diagram illustrating apparatuses according to one embodiment.

Referring to FIG. 5, the UE (i.e. the remote unit) includes a processor, a memory, and a transceiver. The processor implements a function, a process, and/or a method which are proposed in FIG. 4. The gNB (i.e. base unit) includes a processor, a memory, and a transceiver. The processors implement a function, a process, and/or a method which are proposed in FIG. 3. Layers of a radio interface protocol may be implemented by the processors. The memories are connected with the processors to store various pieces of information for driving the processors. The transceivers are connected with the processors to transmit and/or receive a radio signal. Needless to say, the transceiver may be implemented as a transmitter to transmit the radio signal and a receiver to receive the radio signal.

The memories may be positioned inside or outside the processors and connected with the processors by various well-known means.

In the embodiments described above, the components and the features of the embodiments are combined in a predetermined form. Each component or feature should be considered as an option unless otherwise expressly stated. Each component or feature may be implemented not to be associated with other components or features. Further, the embodiment may be configured by associating some components and/or features. The order of the operations described in the embodiments may be changed. Some components or features of any embodiment may be included in another embodiment or replaced with the component and the feature corresponding to another embodiment. It is apparent that the claims that are not expressly cited in the claims are combined to form an embodiment or be included in a new claim.

The embodiments may be implemented by hardware, firmware, software, or combinations thereof. In the case of implementation by hardware, according to hardware implementation, the exemplary embodiment described herein may be implemented by using one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and the like.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A base unit for wireless communication, comprising:
at least one memory; and
at least one processor coupled with the at least one memory and configured to cause the base unit to:
transmit a configuration including a repetition number of a physical uplink control channel (PUCCH), wherein the configuration is determined according to a type of uplink control information (UCI) carried in the PUCCH, and wherein the configuration is radio resource control (RRC) signaling based at least in part on the type of UCI carried in the PUCCH not including a hybrid automatic repeat request acknowledgement (HARQ-ACK); and
receive the PUCCH repeatedly according to the repetition number.

2. The base unit of claim 1, wherein the repetition number is per PUCCH resource.

3. The base unit of claim 1, wherein the at least one processor is further configured to cause the base unit to:
transmit a second configuration including a second repetition number of a second PUCCH, wherein the second configuration is a media access control (MAC) control element (CE), and wherein the second repetition number is per PUCCH resource or per PUCCH resource group.

4. The base unit of claim 1, wherein the type of UCI carried in the PUCCH is one of periodic channel state information (CSI) or a reference signal (SR) corresponding to downlink (DL) semi-persistent scheduling (SPS).

5. The base unit of claim 1, wherein the at least one processor is further configured to cause the base unit to:
transmit a second configuration including a second repetition number of a second PUCCH that carries a type of UCI that includes a HARQ-ACK corresponding to a downlink (DL) transmission scheduled by a downlink control information (DCI), wherein the second configuration is the DCI scheduling the DL transmission.

6. The base unit of claim 5, wherein, the second repetition number is included in a time domain resource assignment field of the DCI.

7. The base unit of claim 5, wherein, the second repetition number is included in a physical downlink shared channel (PDSCH)-to-HARQ feedback timing indicator field of the DCI.

8. The base unit of claim 1, wherein the repetition number is per PUCCH format.

9. A method performed by a base unit, the method comprising:
transmitting a configuration including a repetition number of a physical uplink control channel (PUCCH), wherein the configuration determined according to a type of uplink control information (UCI) carried in the PUCCH, and wherein the configuration is radio resource control (RRC) signaling based at least in part on the type of UCI carried in the PUCCH not including a hybrid automatic repeat request acknowledgement (HARQ-ACK); and
receiving the PUCCH repeatedly according to the repetition number.

10. The method of claim 9, wherein the repetition number is per PUCCH resource.

11. The method of claim 9, further comprising:
transmitting a second configuration including a second repetition number of a second PUCCH, wherein the second configuration is a media access control (MAC) control element (CE), and wherein the second repetition number is per PUCCH resource or per PUCCH resource group.

12. The method of claim 9, wherein the type of UCI carried in the PUCCH is one of periodic channel state information (CSI) or a reference signal (SR) corresponding to downlink (DL) semi-persistent scheduling (SPS).

13. The method of claim 9, further comprising:
transmitting a second configuration including a second repetition number of a second PUCCH that carries a type of UCI that includes a HARQ-ACK corresponding to a downlink (DL) transmission scheduled by a downlink control information (DCI), wherein the second configuration is the DCI scheduling the DL transmission.

14. The method of claim 9, wherein the repetition number is per PUCCH format.

15. A user equipment (UE) for wireless communication, comprising:
at least one memory; and
at least one processor coupled with the at least one memory and configured to cause the UE to:
receive a configuration including a repetition number of a physical uplink control channel (PUCCH), wherein the configuration determined according to a type of uplink control information (UCI) carried in the PUCCH, and wherein the configuration is radio resource control (RRC) signaling based at least in part on the type of UCI carried in the PUCCH not including a hybrid automatic repeat request acknowledgement (HARQ-ACK); and
transmit the PUCCH repeatedly according to the repetition number.

16. The UE of claim 15, wherein the repetition number is per PUCCH resource.

17. The UE of claim 15, wherein the at least one processor is further configured to cause the UE to:
receive a second configuration including a second repetition number of a second PUCCH, wherein the second configuration is a media access control (MAC) control element (CE) for all types of UCI carried in the PUCCH, and the second repetition number is per PUCCH resource or per PUCCH resource group.

18. The UE of claim 15, wherein the type of UCI carried in the PUCCH is one of periodic channel state information (CSI) or a reference signal (SR) corresponding to downlink (DL) semi-persistent scheduling (SPS).

19. The UE of claim 15, wherein the at least one processor is further configured to cause the UE to:
receive a second configuration including a second repetition number of a second PUCCH that carries a type of UCI that includes a HARQ-ACK corresponding to a downlink (DL) transmission scheduled by a downlink control information (DCI), wherein the second configuration is the DCI scheduling the DL transmission.

20. A method performed by a user equipment (UE), the method comprising:
receiving a configuration including a repetition number of a physical uplink control channel (PUCCH), wherein the configuration determined according to a type of uplink control information (UCI) carried in the PUCCH, and wherein the configuration is radio resource control (RRC) signaling based at least in part on the type of UCI carried in the PUCCH not including a hybrid automatic repeat request acknowledgement (HARQ-ACK); and
transmitting the PUCCH repeatedly according to the repetition number.

* * * * *